US009785845B2

(12) United States Patent
Morikawa et al.

(10) Patent No.: US 9,785,845 B2
(45) Date of Patent: Oct. 10, 2017

(54) DRIVE SUPPORT DISPLAY DEVICE

(71) Applicant: DENSO CORPORATION, Kariya, Aichi-pref. (JP)

(72) Inventors: Shohei Morikawa, Ichinomiya (JP); Toshiaki Nakayama, Miyoshi (JP); Hirotaka Goto, Nagoya (JP); Yasutsugu Nagatomi, Nisshin (JP)

(73) Assignee: DENSO CORPORATION, Kariya (JP)

( * ) Notice: Subject to any disclaimer, the term of this patent is extended or adjusted under 35 U.S.C. 154(b) by 99 days.

(21) Appl. No.: 14/714,509

(22) Filed: May 18, 2015

(65) Prior Publication Data

US 2015/0339534 A1 Nov. 26, 2015

(30) Foreign Application Priority Data

May 20, 2014 (JP) ................. 2014-104087

(51) Int. Cl.
*G06K 9/00* (2006.01)
*B60R 1/00* (2006.01)
(Continued)

(52) U.S. Cl.
CPC ............ *G06K 9/00805* (2013.01); *B60R 1/00* (2013.01); *G02B 27/0101* (2013.01); *G06K 9/00201* (2013.01); *G06T 19/006* (2013.01); *G08G 1/161* (2013.01); *G08G 1/164* (2013.01); *G08G 1/166* (2013.01); *G08G 1/167* (2013.01); *B60R 2300/205* (2013.01); *B60R 2300/301* (2013.01); *B60R 2300/308* (2013.01); *B60R 2300/802* (2013.01); *B60R 2300/8093* (2013.01); *G02B 2027/014* (2013.01); *G02B 2027/0141* (2013.01)

(58) Field of Classification Search
CPC ...... B60W 10/20; B60W 30/12; B60W 30/09; B60W 2420/42; B60W 2550/10; G06K 9/00805; G06K 9/00798
See application file for complete search history.

(56) References Cited

U.S. PATENT DOCUMENTS

| | | | |
|---|---|---|---|
| 2011/0128138 A1* | 6/2011 | Yamamoto | B60W 30/0956 340/436 |
| 2013/0154853 A1* | 6/2013 | Chen | G08G 1/096716 340/905 |
| 2015/0049940 A1* | 2/2015 | Siegel | G08G 1/0175 382/165 |

FOREIGN PATENT DOCUMENTS

JP 2008-059178 A 3/2008
JP 2009-223845 A 10/2009
(Continued)

*Primary Examiner* — Zhengxi Liu
*Assistant Examiner* — Raffi Isanians
(74) *Attorney, Agent, or Firm* — Posz Law Group, PLC

(57) ABSTRACT

A drive support display device supporting a drive of a self-vehicle based on a detection result by an object detector regarding a nearby area of the self-vehicle. The device receives object information from an external source, the object information identifying a nearby object existing in the nearby area of the self-vehicle, determines whether the nearby object is detected by the object detector, and provides a warning indicator when the determination section determines that the nearby object is an undetected nearby object that is not detected by the object detector. As a result, the undetected nearby object, which is already identified as existing somewhere nearby the self-vehicle but is invisible therefrom, may be emphasized in an image provided by the drive support display device.

13 Claims, 11 Drawing Sheets

(51) Int. Cl.
*G02B 27/01* (2006.01)
*G06T 19/00* (2011.01)
*G08G 1/16* (2006.01)

(56) References Cited

FOREIGN PATENT DOCUMENTS

| | | |
|---|---|---|
| JP | 2011-087006 A | 4/2011 |
| JP | 2011-227657 A | 11/2011 |

* cited by examiner

DRIVE SUPPORT DISPLAY DEVICE

CROSS REFERENCE TO RELATED APPLICATION

The present application is based on and claims the benefit of priority of Japanese Patent Application No. 2014-104087, filed on May 20, 2014, the disclosure of which is incorporated herein by reference.

TECHNICAL FIELD

The present disclosure generally relates to a drive support display device that supports a drive of a vehicle based on a detection result of a vehicle periphery by using a detector.

BACKGROUND INFORMATION

Generally, various types of drive support display devices have been proposed to aid a driver by displaying a nearby object that is invisible to the driver. That is, an invisible object located in a dead angle or a blind spot near a self-vehicle is displayed to aid the driver and/or for facilitating a driving maneuver.

One such device is an attention-calling display that is disclosed in a patent document 1 (i.e., Japanese Patent Laid-Open No. 2008-58178) which notifies the driver in real-time of an invisible dead-angled vehicle located in a nearby area of a self-vehicle. The device obtains position information of a dead-angle creating vehicle in a travel direction of the self-vehicle. In such case, the position information of the dead-angle creating vehicle is obtained by the self-vehicle from an external information source. That is, the dead-angle creating vehicle is identified at an early timing based on the information from the external source, thereby making if possible to call the driver's attention to such vehicle with a real-time displayed warning.

However, the device disclosed in the patent document 1 must initially recognize or identify the dead-angle creating vehicle based on the position information from the external source in order to display the warning. Therefore, in other words, if the device cannot recognize the dead-angle creating vehicle due to the error of the position information, or if the dead angle is created by a building or the like that is not recognised as a dead-angle creating "vehicle," the device is not capable of displaying the warning of the dead-angled vehicle. That is, the detection ability of the conventional warning display device is limited.

SUMMARY

The present disclosure provides a drive support display device that has information display capability.

In an aspect of the present disclosure, a drive support display device supports a drive of a self-vehicle based on a detection result by an object detector regarding a nearby area of the self-vehicle. The device includes a receiver and a processor with a determination section and a display section therein. The receiver receives object information from an external source, the object information identifying a nearby object existing in the nearby area of the self-vehicle, a determination section in a processor. The determination section determines whether the nearby object is detected by the object detector. The display section provides a warning indicator when the determination section determines that the nearby object is an undetected nearby object that is not detected by the object detector.

According to the present disclosure, when the nearby object identified by the object information from the external source of the self-vehicle is not detected in the nearby area, the nearby object, which is already identified as existing somewhere nearby the self-vehicle but is invisible therefrom (e.g., existing in a dead-angle), may be emphasized in an image of the drive support display that is provided by the drive support display device. This scheme enables an attention indicator for the invisible nearby object in a dead angle, that is, for an "identified-but-not-detected" obstacle in the nearby area. Further, the nearby object is identified and is emphasized in the drive support display for the attention calling based on the object information from the external source, without recognizing the dead-angle creating (DAC) object, i.e., without regard to whether the DAC object is existing nearby or what type the DAC object is. In other words, improvement effectiveness of the drive support display is achieved.

In addition, the drive support display device also includes a selection section in the processor. The selection section selects a colliding object from among the nearby objects that are identified by the object information received by the receive, and indicating the colliding object with the warning indicator, the colliding object being predicted to collide with the self-vehicle.

Thus, selection of the nearby objects identified by the received object information is performed, for selecting or "sifting" only the colliding object(s) that are highly likely to collide with the self-vehicle, for the warning indicator. In other words, not-so-hazardous/relevant nearby objects, or the objects with little colliding possibility, are sifted out in the selection even when they are in the invisible state (i.e., in the dead angle). Therefore, a bothering display that bothers the occupant or the driver with an warning indicator for all invisible nearby objects including ones with little or no collision possibility, which may otherwise be a trade-off of the improved effectiveness of the drive support display, is prevented by the drive support display device of the present disclosure.

In addition, the drive support display device also includes a limit section in the processor. The limit section limits the nearby area to a partial area within which the nearby object is determined to exist. The determination section determines whether the nearby object is detected within the partial area.

Thus, based on the object information, the detection area for defecting the nearby object is limited, or is narrowed down, to a partial area in which the nearby object is estimated to be existing, thereby reducing a turn-around time from a detection of the nearby object to a determination of the display of such object. In other words, the invisible nearby object is identified at an earlier timing, thereby enabling a real-time warning indicator of such object and attention calling thereto.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, embodiments of the present disclosure are described based on the drawings. The same numerals are assigned to the same elements in each of the embodiments, and redundant description of the same elements is saved. Further, not only explicitly-described combination of the two or more embodiments but also other combinations of the embodiments, unless otherwise described as hindered due to technical difficulty or the like, may be allowed.

First Embodiment

Figure 1:
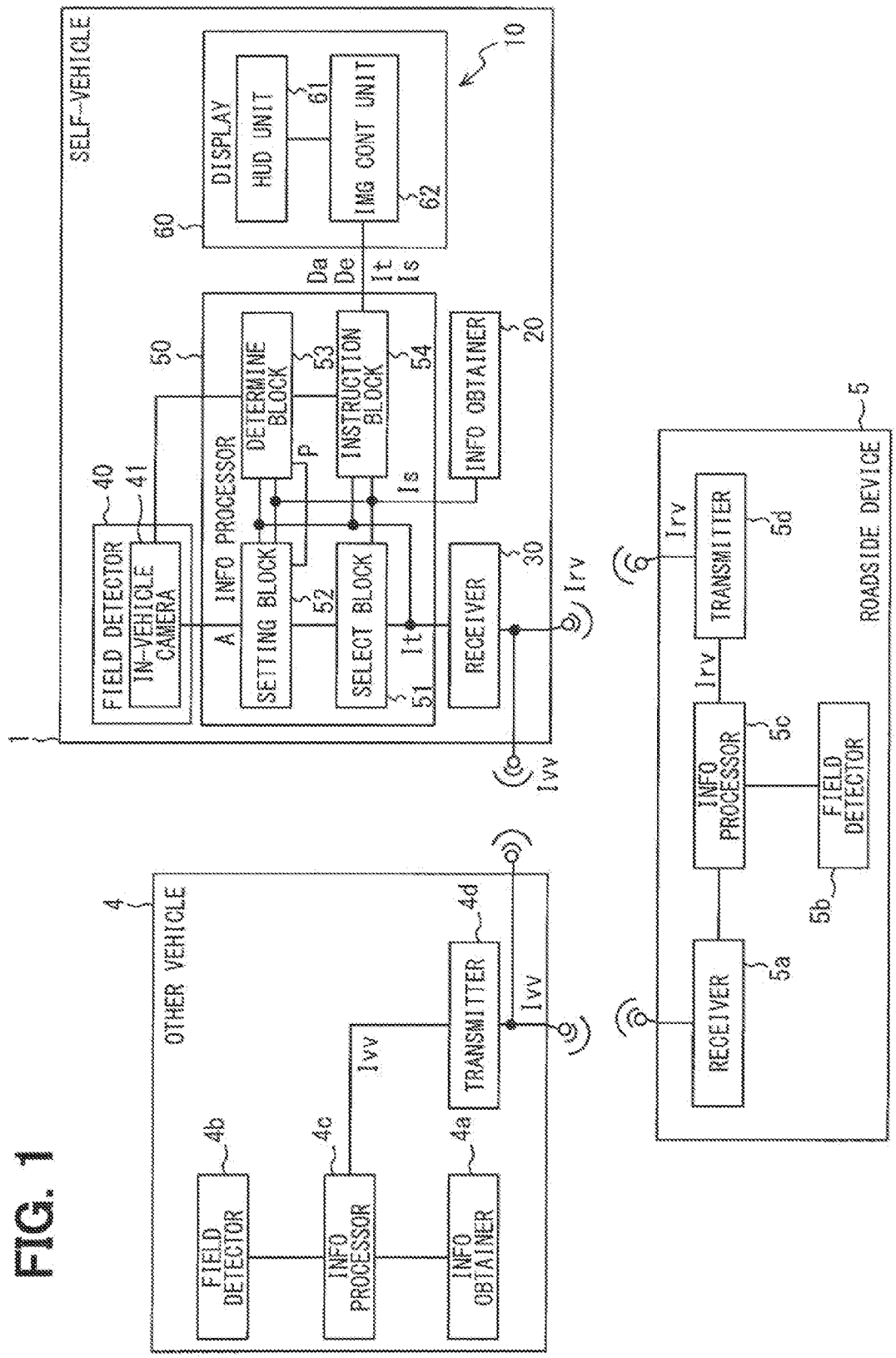
FIG. 1 is a block diagram of a drive support display device and other related devices of the present disclosure.

As shown in FIG. 1, a drive support display device 10 in the first embodiment of the present disclosure is installed in a self-vehicle 1, which is an automobile in this example. The drive support, display device 10 supports a drive operation of the self-vehicle 1 performed by a driver, by providing display of some sort, i.e., an informational message, a geometric figure or the like.

Figure 2:
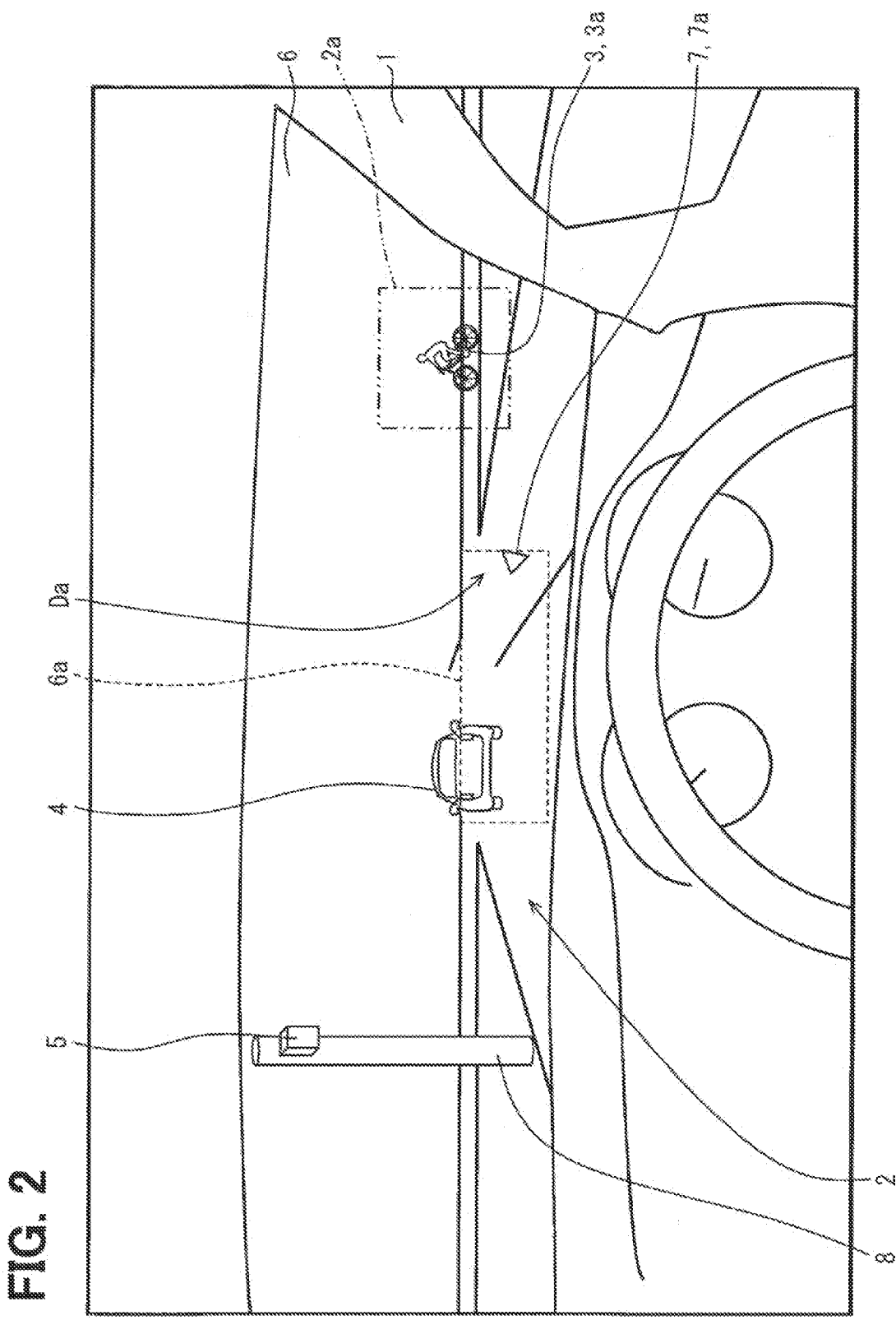
FIG. 2 is an illustration of a display by the drive support display device of FIG. 1.
Figure 3:
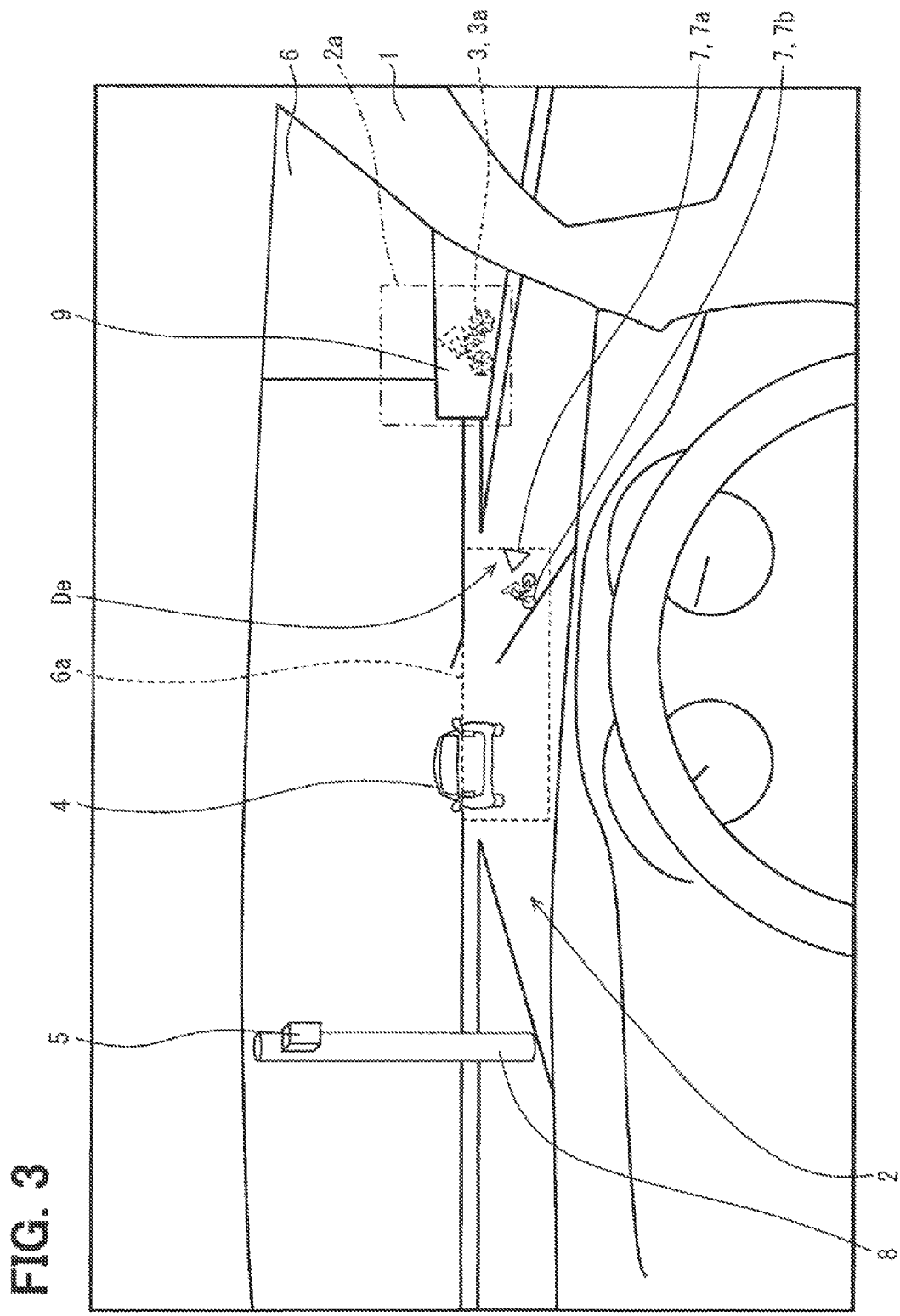
FIG. 3 is an illustration of another display by the drive support display device of FIG. 1.

More concretely, the drive support display device 10 draws a driver's attention to a nearby object 3 that exists in a nearby area 2 of the self-vehicle 1, by performing a display operation that displays images (on an inner surface of the windshield) as shown in FIGS. 2 and 3.

The nearby area 2 in the present embodiment means a preset range, e.g., a range of 40 meters, which spreads in front of the self-vehicle 1. The nearby object 3 means an obstacle, either moving or staying, that may possible hinder a travel of the self-vehicle 1, which is, for example, the other vehicle including a bicycle, an artificial structure, a human being, an animal, etc. existing in the nearby area 2.

As shown in FIG. 1, the drive support display device 10 performs a vehicle-to-vehicle communication with an other vehicle 4 (also see the FIGS. 2 and 3) which is external to the self-vehicle 1 in a travel state or in a stop state. Concretely, the other vehicle 4 is an automobile etc, which is capable of performing a vehicle-to-vehicle communication, and is provided with an information obtainer 4a, a field detector 4b, an information processor 4c, and a transmitter 4d, for example.

The information obtainer 4a, e.g., a combination of a GPS sensor, a speed sensor, etc., obtains a travel position, a travel direction, and a travel speed as travel information of the other vehicle 4.

The field detector 4b consists of an ultrasonic sensor, a millimeter wave radar, an in-vehicle camera, etc, for example, and detects objects in a nearby area (not shown) of the other vehicle 4.

The information processor 4c consists of microcomputers etc., for example, and is connected to the information obtainer 4a and to the field detector 4b. The information processor 4c determines an obstacle which could possibly be a nearby object 3 of the self-vehicle 1, based on the detection result of the field detector 4b. The information processor 4c generates obstacle information Ivv based on the obtained information by the information obtainer 4a and the detection result by the field detector 4b, which is used for distinguishing the determined obstacle. The obstacle information Ivv includes, as information about an obstacle, a type of the object, a position of the object, a moving direction of the object, and a moving speed of the object.

The transmitter 4d consists of a transmission antenna etc., for example, and is connected with the information processor 4c. The transmitter 4d transmits the obstacle information Ivv to the nearby area of the other vehicle 4 by wireless communications in a standard frequency band of the vehicle-to-vehicle communication.

The drive support display device 10 performs road-to-vehicle communication with a roadside device 5 that is disposed on a roadside and is exterior to the self-vehicle 1. Concretely, the roadside device 5 may be, for example, a beacon of a traffic infrastructure capable of performing the road-to-vehicle communication, or a base station of mobile communication, etc., and is provided with a receiver 5a, a field detector 5b, an information processor 5c, and a transmitter 5d, for example.

The receiver 5a consists of a receiving antenna etc, for example, and receives the transmitted information from the other vehicle 4 or from a portable device. The field detector 5b consists of a roadside camera etc., for example, and detects objects in the nearby area (not shown in the drawing) of the roadside device 5. The information processor 5c consists of microcomputers etc., for example, and is connected to the receiver 5a and the field detector 5b. The information processor 5c determines the obstacle which could possibly be the nearby object 3 of the self-vehicle 1 based on the reception information by the receiver 5a, and the detection result fey the field detector 6b. The information processor 5c generates obstacle information Irv based on the reception information by the receiver 5a and the detection result by the field detector 5b, which is used for distinguishing the determined obstacle. The obstacle information Irv includes, as information about an obstacle, a type of the object, a position of the object, a moving direction of the object, and a moving speed of the object. The transmitter 5d consists of a transmission antenna etc., for example, and is connected with the information processor 5c. The transmitter 5d transmits the obstacle information Irv to the nearby area of the roadside device 6 by the wireless communications in a standard frequency band of the road-to-vehicle communication.

The drive support display device 10 is provided with an information obtainer 20, a receiver 30, a field detector 40, an information processor 60, and a display section 60, for the communication with external devices 4 and 5 of the self-vehicle 1, for receiving the obstacle information Irv, Ivv and for performing attention calling to the nearby object 3.

The information obtainer 20 obtains a travel position, travel direction, and a travel speed, for example, as a combination a GPS sensor, a speed sensor, etc. as self-vehicle information Is about the travel state of the self-vehicle 1.

The receiver 30 as a "receiver" in the claims consists of a receiving antenna, etc., for example, and receives the obstacle information Irv, Ivv from the external devices 4 and 5 of the self-vehicle 1 with a predetermined sampling period. In this example, the receiver 30 receives the obstacle information Irv as the object information It about the nearby object 3, when the distance to the other vehicle 4 that is traveling in front of the self-vehicle 1 is within a preset distance of 40 meters, for example. Therefore, the nearby object 3 identified by the object information. It is in agreement with the obstacle within the preset distance identified by the obstacle information Irv, in this case.

Further, the receiver 30 receives the obstacle information Irv as the object information Irv about the nearby object 3, when the distance to the roadside device 5 that is disposed in front of the self-vehicle 1 is within a preset distance of 40 meters, for example. Therefore, the nearby object 3 identified by the object information It is in agreement with the obstacle within the preset distance identified by the obstacle information Irv, in this case.

According to the above, the obstacle information Irv received from at least one other vehicle 4 via the vehicle-to-vehicle communication and the obstacle information Irv received from at least one roadside device 5 via the road-to-vehicle communication are included in the object information It. Therefore, in the present embodiment, the object information It is obtained by performing a logical sum process on/for the obstacle information Irv, Ivv which are respectively received by the receiver 30 at every sampling period.

The field detector 40 as a "field detection" in the claims consists of an in-vehicle camera, an ultrasonic sensor, a millimeter wave radar, etc, for example, and detects objects the nearby area 2 of the self-vehicle 1.

Here, the field detector 40 of the present embodiment at least has an in-vehicle camera 41 which captures an image of a front field of the self-vehicle 1, and is capable of defecting objects in the nearby area 2 including the nearby object 3 based on the captured image. Therefore, in the present embodiment, an entire area that is capturable by the in-vehicle camera 41 is defined as an entire detection area of the nearby area 2, which is a detection area of a detection object, i.e., the nearby object 3. Although, in the present embodiment, the field detector 40 is described as a part of the drive support display device 10, the field defector 40 in the self-vehicle 1 may be a device separate from the drive support display device 10.

The information processor 50 consists of microcomputers etc., for example, and is connected to the information obtainer 20, the receiver 30, and to the field detector 40. The information processor 50 has plural blocks 51, 52, 53, and 54 that are provided as function blocks or sections which are implemented by an execution of a process program.

The selection block 51 as a "selection section" in the claims selects the colliding object 3a from among at least one nearby object 3 that is identified by the object information It, which is predicted to collide with the self-vehicle 1.

More practically, the selection block 51 first identifies the nearby object 3 by the object information It which is received by the receiver 30. Further, by using both of the object information It received by the receiver 30 and the self-vehicle information Is which is obtained by the information obtainer 20, the selection block 51 computes the probability of collision of the self-vehicle 1 and the nearby object 3. As a result, when the computed probability of collision is equal to or greater than a preset probability, the selection block 51 selects the nearby object(s) 3 having the collision probability being equal to or greater than the preset probability as the colliding object(s) 3a. In this case, the collision probability is computed by a simulator executed by the process program. That is, the collision probability is computed based on (i) the clearance derived from a comparison between the current position of the colliding object 3a and the travel position of the self-vehicle, (ii) the moving direction of the colliding object 3a and the travel direction of the self-vehicle 1, and (iii) the moving speed of the colliding object 3a and the travel speed of the self-vehicle 1. Further, the preset probability, i.e., the selection criterion for selecting the colliding object 3a, is set to the "safest" value, in terms of reserving/guaranteeing safety of the self-vehicle 1 by calling the attention of the driver/occupant in the vehicle.

The setting block 52 serving as a "limit section" and a "setting section" in the claims performs variable setup of a detection range A and a detection parameter P, for the detection operation. The detection range A may be used for detecting the nearby object 3 in the nearby area 2 as the colliding object 3a by the field detector 40. The detection parameter P may be used to set the sensitivity for recognizing the colliding object 3a in the image data of the partial area 2a, which is equal to the detection range A.

More practically, the setting block 52 limits or narrows the defection range A for detecting the colliding object 3a, by "cropping" the actually-captured image of the nearby area 2 from the in-vehicle camera 41 to a cropped image that only includes a partial area 2a in which the colliding object 3a is estimated to be existing (see the FIGS. 2 and 3), for creating the image data. In addition, the setting block 52 changes the sensitivity for recognizing the colliding object 3a in the image data of the partial area 2a (i.e., in the detection range A) toward a higher sensitivity side. That is, the sensitivity for recognizing the colliding object 3a is increased.

A setup of the detection range A and the detection parameter P is based on the object information It received by the receiver 30 and based on the self-vehicle information Is obtained by the information obtainer 20. For the setting of the detection range A and the detection parameter P, at least the current position of the colliding object 3a and the travel position of the self-vehicle 1 are used.

The detection range A set up in the above manner by the setting block 52 is given to the field detector 40, and only the partial area 2a in the nearby area 2 is captured as the image data. Further, the detection parameter P set up by the setting block 52 is given to the determination block 53 which is described later in detail, and the defection sensitivity of the colliding object 3a in the image data of the partial area 2a is raised.

The determination block 53 as a "determination section" in the claims determines whether the nearby object 3 is detected in the nearby area 2 based on the object information It received by the receiver 30 and the self-vehicle information Is obtained by the information obtainer 20.

More practically, after the selection of the colliding object 3a that has been selected from among the nearby objects 3, the determination block 63 compares (i) the object information It and the self-vehicle information Is which are used for such selection with (ii) detection information based on the image data of the partial area 2a that has been limited (to a smaller area) by the setting block 52. In such comparison, the current position of the colliding object 3a and the travel position of the self-vehicle 1 as well as the detection sensitivity raised by the setting block 52 as the detection parameter P are used at least.

Then, the comparison result may lead to a positive determination by the determination block 53 indicating that the colliding object 3a has been defected in the partial area 2a of the nearby area 2, that is, the object 3a is visible from the self-vehicle 1, when the object information It and the detection information on the partial area 2a match (with each other).

On the other hand, the comparison result may lead to a negative determination by the determination block 53 indicating that the colliding object 3a has not been detected in the partial area 2a of the nearby area 2, that is, the object 3a is invisible from the self-vehicle 1, when the object information It and the defection information on the partial area 2a do not match (with each other).

The instruction block 54 provides to the display section 60 a display instruction according to the determination result by the determination block 53. More concretely, when a positive determination is made by the determination block 53, the instruction block 54 instincts the display section 60 to perform an attention indicator Da (refer to FIG. 2), for calling attention to the colliding object 3a which is a visible nearby object 3 in the nearby area 2a. In such case, the instruction block 54 gives the object information It about the colliding object 3a in a visible state to the display section 60 together with an instruction of the attention indicator Da and the self-vehicle information Is used for the selection of the object 3a.

On the other hand, when the negative determination is made by the determination block 53, the instruction block 54 instructs the display section 60 to perform an warning indicator De (refer to FIG. 3) more strongly emphasizing the danger of the object 3a than the attention indicator Da, for calling attention to the colliding object 3a which is an invisible nearby object 3 in the nearby area 2a. In such case, the instruction block 54 gives the object information It about the colliding object 3a in an invisible state to the display section 60 together with an instruction of the warning indicator De and the self-vehicle information Is used for the selection of the object 3a.

The display section 60 as a "display section" in the claims has a head-up display (HUD) unit 61 and an image control unit 62. The HUD unit 61 may be, for example, a combination of a display device, an optical system, and the like, and projects a composed display image 7 to a windshield 6 of the self-vehicle 1 (see FIGS. 2, 3). Thus, the projected display image 7 projected to the windshield 6 is visibly displayed for the occupant in the self-vehicle 1 as a virtual image which may be displayed as the attention indicator Da or as the warning indicator De.

Here, the windshield 6 as a "transparent member" in the claims allows an actual image 8 of objects in the nearby area 2 of the self-vehicle 1, thereby enabling the occupant of the self-vehicle 1 to view the virtual image of the attention indicator or the warning indicator overlapping on the actual image 8 of the objects in the nearby area 2. Further, a projection area 6a of the image 7 on the windshield 6 is, in the present embodiment, limited to a lower range of the shield 6 of the self-vehicle 1, as shown in a dashed line in FIGS. 2 and 3.

The image control unit 62 generates data of the image 7 projected to the windshield 6 by the HUD unit 61 according to an instruction from the instruction block 54. More concretely, when an instruction of the attention indicator Da comes in from the instruction block 54, the image control unit 62 generates data of a pointer image 7a shown in FIG. 2 by utilizing the object information It and the self-vehicle information Is. In such case, the pointer image 7a is generated and projected as a virtual image which points to the colliding object 3a as the nearby object 3 in a visible state.

Here, the pointer image 7a in the present embodiment, which is generated based on the current position of the colliding object 3a and the travel position of the self-vehicle 1, is capable of pointing to the colliding object 3a that is visible through the windshield 6 with its triangular pointing shape.

Further, the pointer image 7a in the present embodiment is generated based on the moving direction of the colliding object 3a and the travel direction of the self-vehicle 1, and is also generated based on the moving speed of the colliding object 3a and the travel speed of the self-vehicle 1, thereby always movably displayed to appropriately follow the move of the colliding object 3a.

Therefore, the pointer image 7a generated as an image data in the above-described manner forms a display image to be projected by the HUD unit 61 to the windshield 6, and becomes a viewable virtual image of the attention indicator Da for the colliding object 3a.

On the other hand, when an instruction of the warning indicator De comes in from the instruction block 54, the image control unit 62 generates data of an object image 7b as shown in FIG. 3 by utilizing the object information It and the self-vehicle information Is. In such case, the object image 7b is generated to take an imitation form, i.e., imitating the shape of the colliding object 3b, which is an invisible nearby object 3, being composed as a combination of geometric figures, for example. That is, in FIG. 3, a bicycle shape is generated as the object image 7b of the colliding object 3a. The object image 7b of the colliding object 3a may take different shapes when the colliding object 3a is different from a bicycle, i.e., always imitating the actual shape of the object 3a.

Here, the object image 7b in the present embodiment, which is generated based on the current position of the colliding object 3a and the travel position of the self-vehicle 1, is displayed as a virtual image at a close position in the projection area 6a which is positioned as close as possible to the current position of the colliding object 3a in an invisible state.

Further, the object image 7b in the present embodiment is generated based on the moving direction of the colliding object 3a and the travel direction of the self-vehicle 1, and is also generated based on the moving speed of the colliding object 3a and the travel speed of the self-vehicle 1, thereby always movably displayed to appropriately notifying, or indicating, the move of the colliding object 3a.

Further, in the present embodiment, the pointer image 7a is also generated is displayed as a virtual image at a close position of the object image 7b as shown in FIG. 3, for pointing the invisible colliding object 3a.

Therefore, the object image 7b generated as an image data in the above-described manner together with the pointer image 7a forms a display image to be projected by the HUD unit 61 to the windshield 6, and becomes a viewable virtual image of the warning indicator Da for the colliding object 3a, which takes a different form from the attention indicator Da for emphasizing and calling attention to the object 3a.

Figure 4:
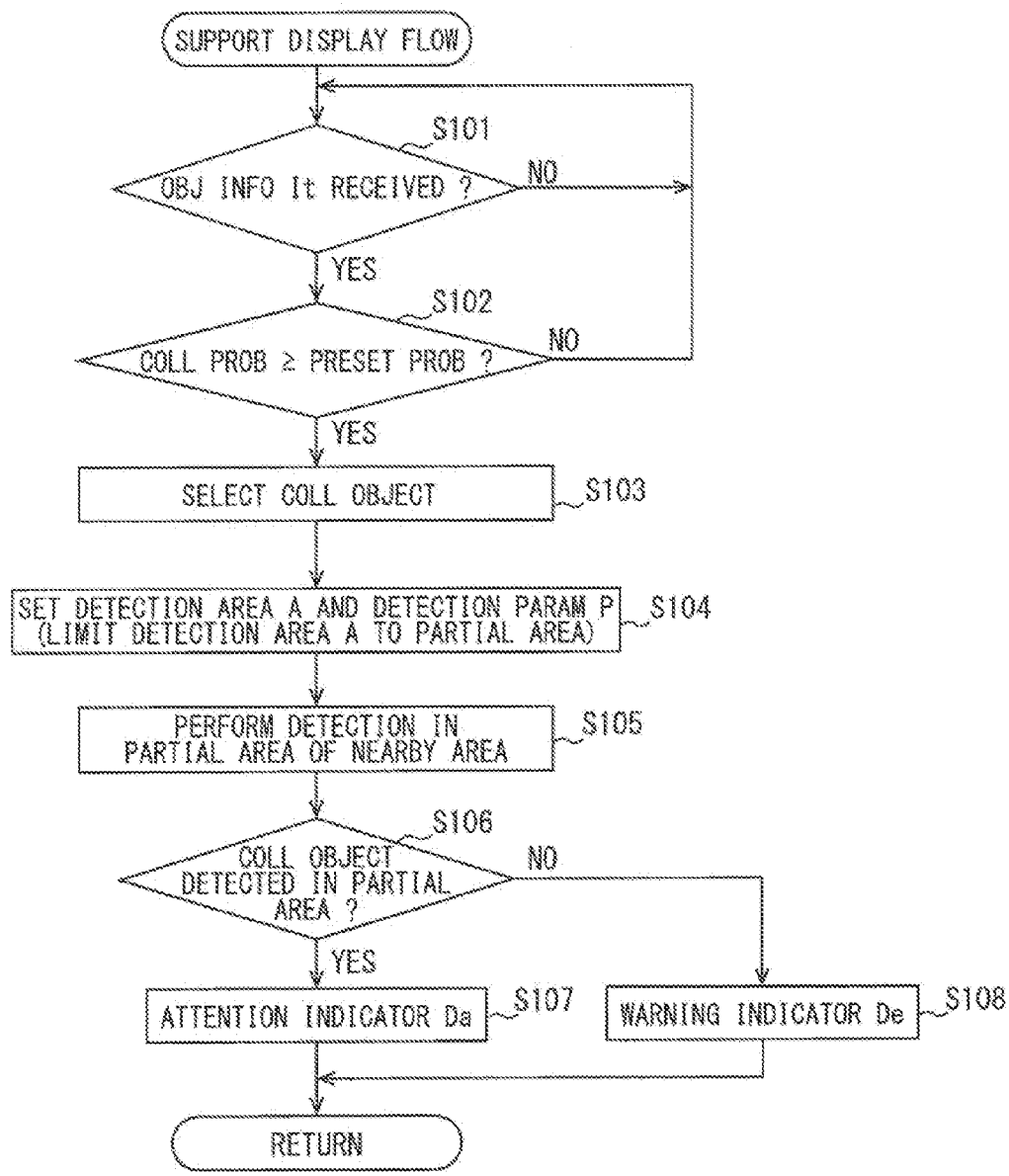
FIG. 4 is a flowchart of a support display flow by the drive support display device of FIG. 1.

Now, a procedure for displaying a drive support by the drive support display device 10 is described as a flowchart, i.e., as a support display flow, with reference to FIG. 4. The support display flow is started when an engine switch is turned ON in the self-vehicle 1, and is finished when the switch is turned OFF.

At S101 of the support display flow, it is determined by the receiver 30 whether the obstacle information Irv, Ivv from the external devices 4 and 5 of the self-vehicle 1 is received as the object information It. While the determination at S101 is negative, S101 is repeated. When the determination at S101 is positive, the flow proceeds to S102.

At S102, it is determined by the selection block 51 whether the collision probability of the nearby object 3 that is identified by the object information It received at S101 is equal to or greater than the preset probability. While the determination at S102 is negative, the flow keeps returning to S101. When the determination at S102 is positive, the flow proceeds to S103

At S103, the nearby object 3 having the greater collision probability greater than the preset probability is selected by the selection block 51 as the colliding object 3a.

Then, at S104, the defection range A for defecting the nearby object 3 as the colliding object 3a and the detection parameter P are set by the setting block 52.

Then, at S105, according to the setting of the detection range A at S104, the field defector 40 detects an object in the partial area 2a of the nearby area 2, and the image data of the area 2a is generated.

Then, at S106, it is determined by the determination block 53 according to the detection parameter P set at S104 whether the nearby object 3 is detected as the colliding object 3a in the partial area 2a of the nearby area 2.

When the determination is positive at S106, the flow proceeds to S107.

At S107, attention calling to the colliding object 3a, which is a positively-determined nearby object 3 at S106, is performed by the attention indicator Da according to the instruction from the instruction block 64 to the display section 60.

On the other hand, when the determination is negative at S106, the flow proceeds to S108.

At S108, attention calling to the colliding object 3a, which is a negatively-determined nearby object 3 at S106, is performed by the warning indicator De according to the instruction from the instruction block 54 to the display section 60.

Then, after executing S107 or S108, the flow returns to S101.

Operation Effects

The operation effects of the first embodiment described above are as follows.

According to the first embodiment, when the nearby object 3 identified by the received object information It from the external source of the self-vehicle 1 is not detected in the nearby area 2, assuming that the nearby object 3 is existing but is in an invisible state (e.g., existing in a dead angle), the nearby objects may be emphasized in a display (as a possibly-dangerous object).

The above-described scheme of the drive support display provides the attention indicator Da for the invisible nearby object 3 in a dead angle, that is, for an "identified-but-not-detected" obstacle in the nearby area 2.

Further, the nearby object 3 is identified and is emphasized in the drive support display for the attention calling based on the object information It from the external source, without recognizing a dead-angle creating (DAC) object 9 in FIG. 3, i.e., without regard to whether the DAC object 9 is existing nearby or what type the DAC object 9 itself is. In other words, improved effectiveness of the drive support display is achieved.

According to the first embodiment, the selection of the nearby objects 3 is performed (i) for selecting, from among the nearby objects 3 identified by the received object information It, the colliding object 3a which is predicted as colliding with the self-vehicle 1, and (ii) for the attention indicator Da for the colliding object 3a.

Therefore, bothering drive support display, bothering the occupant or the driver in the self-vehicle 1 by the warning indicator for ail invisible nearby objects 3 even for the object with little collision probability, which may otherwise be a trade-off of the improved effectiveness of the drive support display, is prevented by the drive support display device of the present disclosure.

According to the first embodiment, the detection area for detecting the nearby object 3 is limited, or is narrowed down, to the partial area 2a in the nearby area 2 based on the object information It, which is an area where the nearby object 3 is predicted to be existing. Therefore, a "turn-around" time from a detection of the nearby object 3 to a determination of the display of the nearby object 3 is reduced. In other words, the invisible nearby object 3 is identified at an earlier timing, thereby enabling a real-time warning indicator De of the nearby object 3 for a quicker attention calling thereto.

According to the first embodiment, the detection parameter P set for the detection of the nearby object 3 changes to the high-sensitivity side based on the received object information It, thereby enabling a securer detection of the invisible nearby object 3. That is, the defection parameter P is increased. Therefore, lowered effectiveness for the detection of the invisible nearby object 3 is prevented.

In addition, according to the first embodiment, whether the nearby object 3 has been detected is determined based on the object information It which includes the obstacle information Ivv, Irv received from the external devices 4 and 5 of the self-vehicle 1 via the vehicle-to-vehicle communication and the road-to-vehicle communication.

The above-described scheme enables the nearby object 3 in the invisible state to be correctly/accurately identified by the communication with the external devices 4 and 5 of the self-vehicle 1 even when a dead-angle creating object that creates a dead angle and puts the nearby object 3 in an invisible state is not recognized, as to whether the dead-angle creating object is existing or what type it is. Therefore, together with the improved effectiveness of the drive support display, the warning indicator De for the nearby object 3 in the invisible state is performed with an improved accuracy.

In addition, according to the first embodiment, the nearby object 3 that is identified by the received object information It becomes subject either to the attention indicator Da as a visible object when the nearby object 3 is detected (by the field detector 40) or to the warning indicator De as an invisible object when the nearby object 3 is not defected (by the field defector 40).

In other words, the invisible nearby object 3 which is more important in terms of drive support display is provided with the warning indicator De that has a different form from the attention indicator Da for the visible object 3, thereby enabling the warning indicator De to be more "visible" and more easily recognizable than other drive support displays.

Further, improved effectiveness of the drive support display prevents the attention indicator Da to be erroneously performed for the visible nearby object 3 for the distinction of the invisible object 3.

In addition, according to the first embodiment, the attention indicator Da and the warning indicator De are realized as a virtual image display, by projecting the image 7 to the windshield 6 which is a transparent member and allows the real image 8 of the objects in the nearby area 2 of the self-vehicle 1 to pass therethrough. The attention indicator Da in this case is realized as a virtual image display of the pointer image 7a that points to the nearby object 3. Therefore, the occupant of the self-vehicle 1 is prevented from being bothered by a virtual image display of the pointer image 7a, i.e., by the attention indicator Da, which is dedicated for the pointing of the nearby object 3 in a relatively simple shape. On the other hand, the warning indicator De is realized by a virtual image display of the object image 7b that at least imitates the actual shape of the object 3. Therefore, the virtual image display of the nearby object 3 provides reality for the object image 7b and for the nearby object 3, thereby more effectively calling attention to the nearby object 3 based on easy recognition of the warning indicator De.

Second Embodiment

Figure 5:
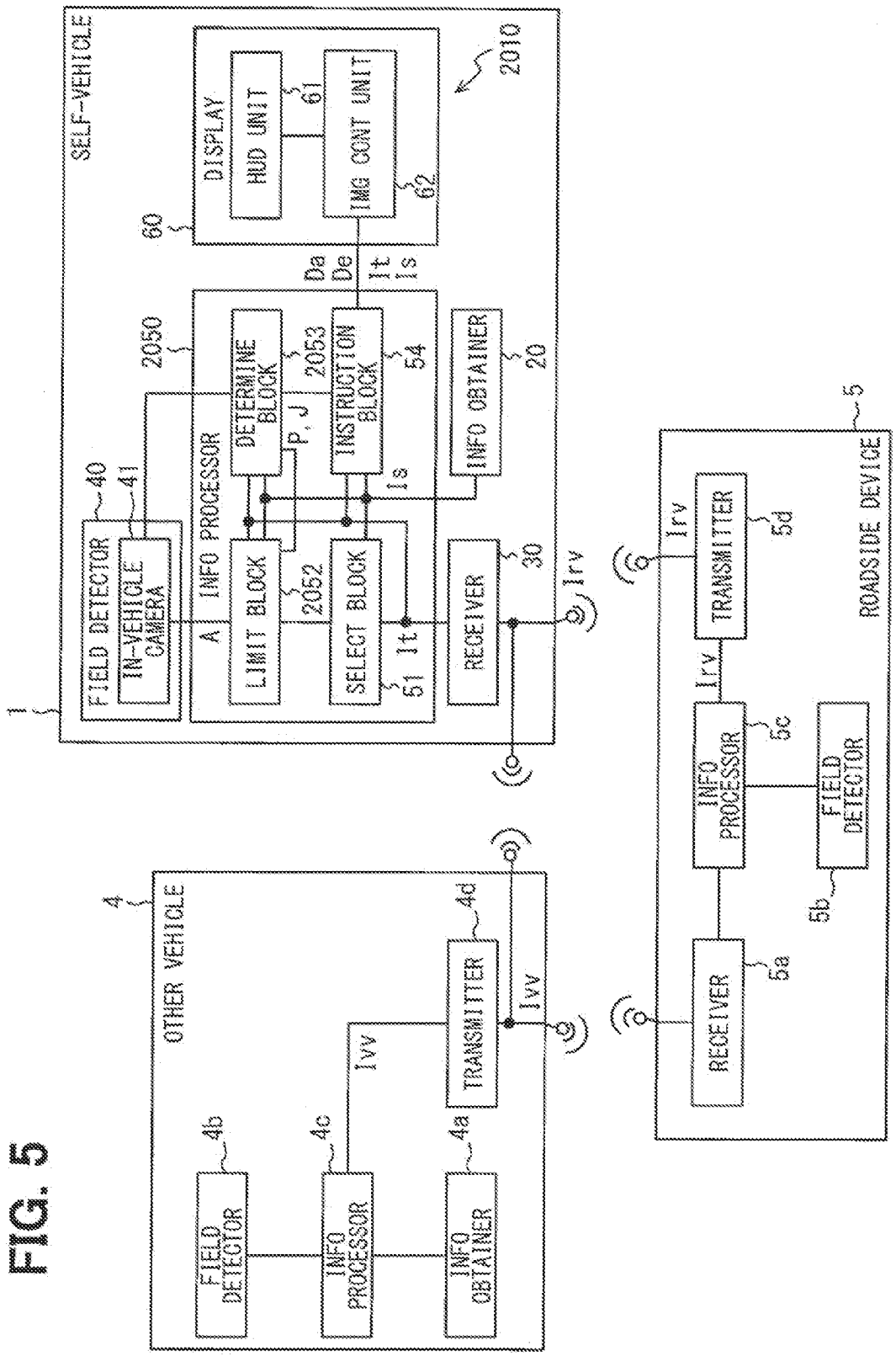
FIG. 5 is a block diagram of a drive support display device and other related devices of the present disclosure.

As shown in FIG. 5, the second embodiment of the present disclosure is a modification of the first embodiment. The information processor 2050 in the second embodiment has a limit block 2052 as a functional block replacing the setting block 52.

The limit block 2052 serving as a "limit section" and a "determination section" sets, while performing variable setting for the detection parameter P just like the first embodiment, a fixed area as the defection range A, i.e., the entirety of the nearby area 2 is set as the defection range A for the creation of the image data. Further, the limit block 2052 limits the entire nearby area 2 to a part of it, limiting a scope of detection by a determination block 2053 for defecting the nearby object 3 as the colliding object 3a.

More practically the limit block 2052 limits the partial area 2a of the nearby area 2 where the colliding object 3a is estimated to be existing as a determination object area J by the determination block 2053. Limitation of the partial area 2a as such the determination object area J is performed based on the object information It received by the receiver 30 and the self-vehicle information Is obtained by the information obtainer 20.

In such case, the current position of the colliding object 3a and the travel position of the self-vehicle 1 are at least used for limiting the partial area 2a.

The detection range A set up by the limit block 2052 in the above-described manner is given to the field detector 40, and the entire nearby area 2 is turned into the image data. Further, the detection parameter P and the determination object area J set by the limit, block 2052 are given to the determination block 2053 which is described later in detail, which realizes a heightened detection sensitivity for defection of the colliding object 3a in the image data of the partial area 2a, i.e., in the detection object area J.

In the information processor 2050 having the limit block 2052, the determination block 2053 serving as a "determination section" in the claims compares (i) defection information from the limit block 2052 which is limited to the partial area 2a based on the image data of the entire nearby area 2 with (ii) the object information It and the self-vehicle information Is according to the first embodiment. Other than the above point, the determination block 2053 functions in the same manner as the determination block 53 of the first embodiment.

Figure 6:
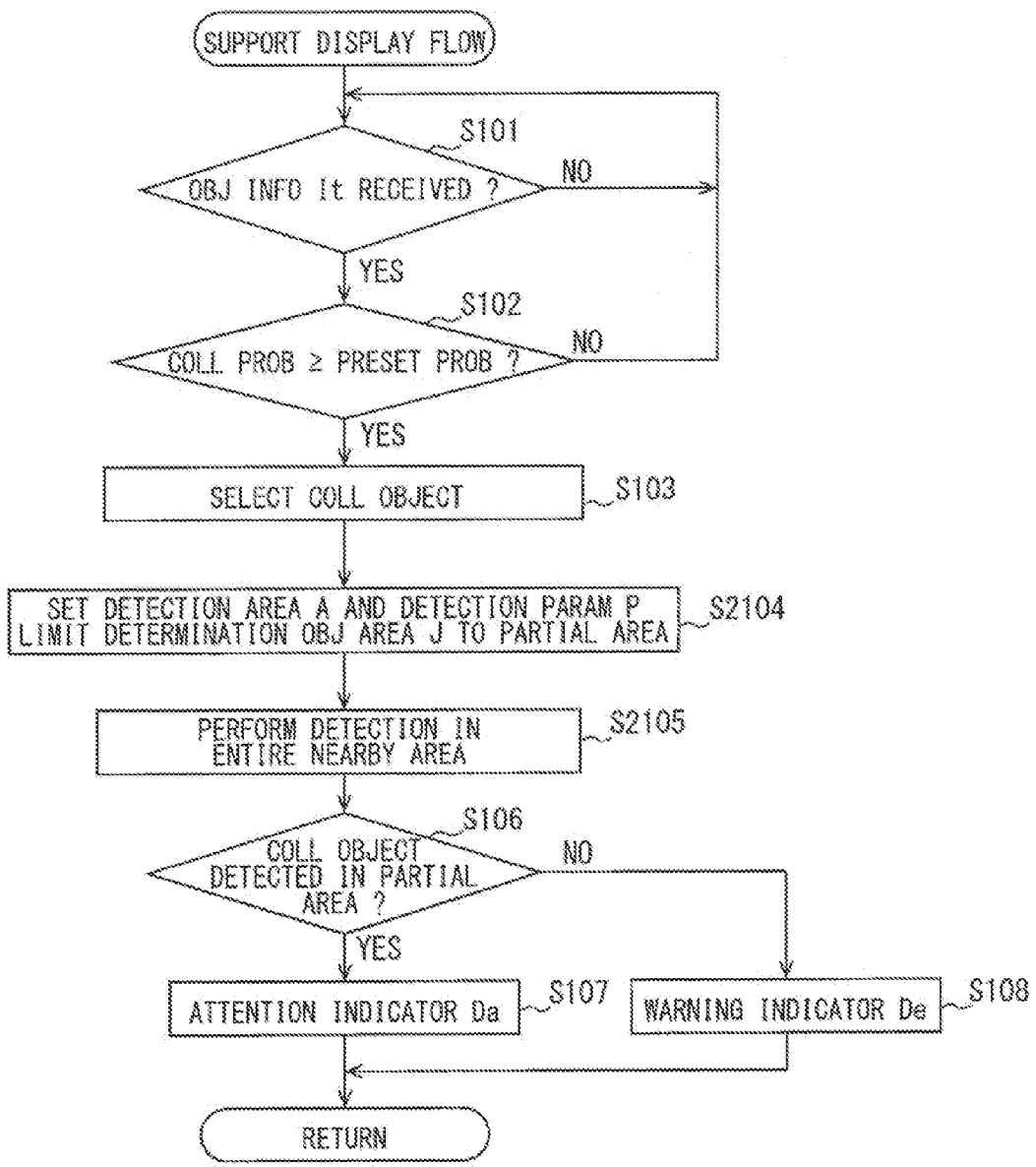
FIG. 6 is a flowchart of a support display flow by the drive support display device of FIG. 5.

Now, a driving support display apparatus 2010 having the information processor 2050 described above performs a support display flow shown in FIG. 6, in which S104 and S105 are replaced with S2104 and S2105, respectively.

Concretely at S2104, the limit block 2052 sets the detection range A and the defection parameter P, and the determination object area J handled in the determination block 2053 is limited to the partial area 2a in the nearby area 2.

Furthermore, at S2105, according to the detection range A set at S2104, the entire area in the nearby area 2 is detected by the field detector 40, for creating the image data.

Other than the above points, the support display flow is performed in the same manner as the first embodiment.

According to the second embodiment described above, the same operation effects as the first embodiment are achieved.

Third Embodiment

Figure 7:
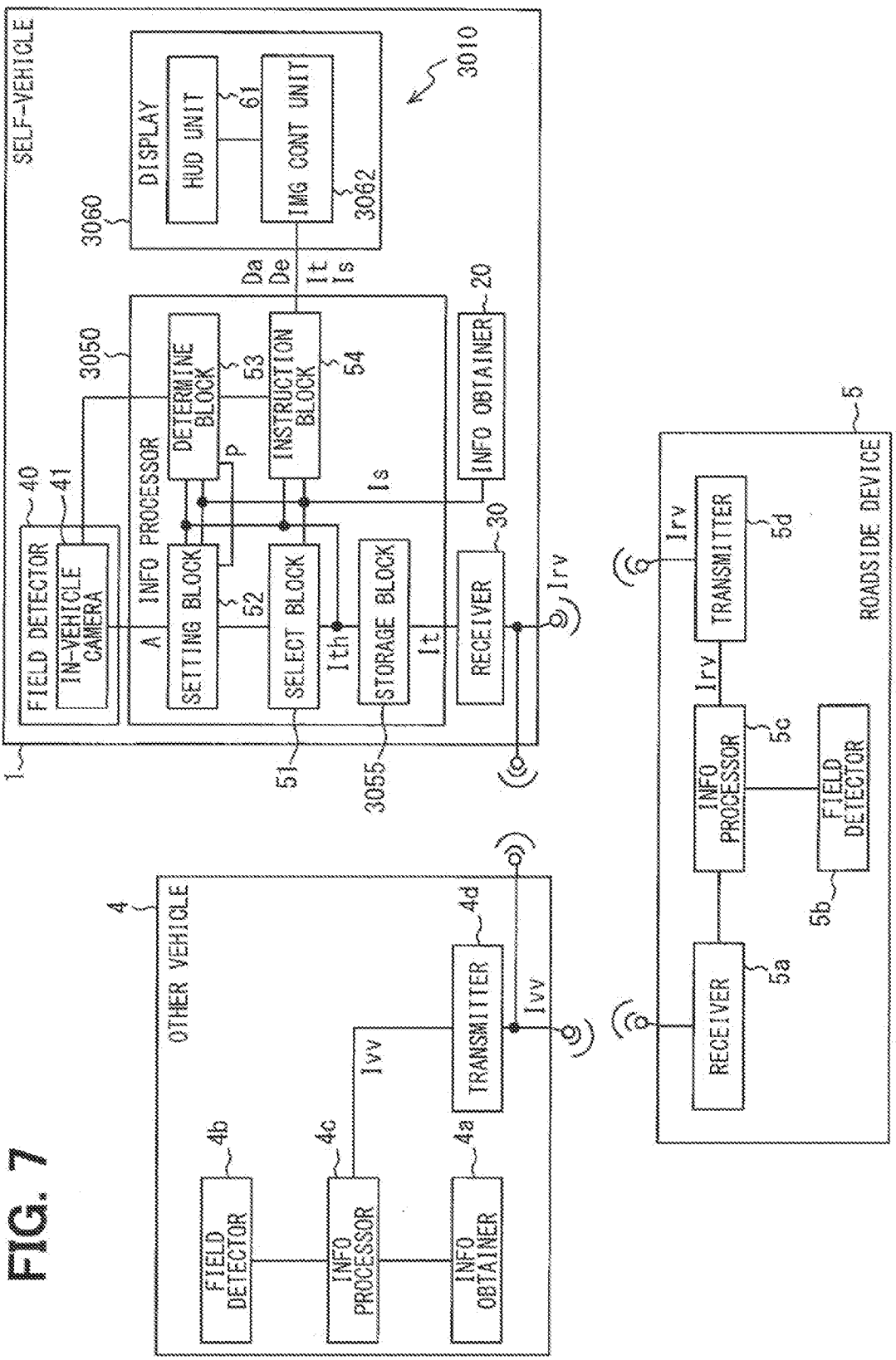
FIG. 7 is a block diagram of a drive support display device and other related devices of the present disclosure.
Figure 8:
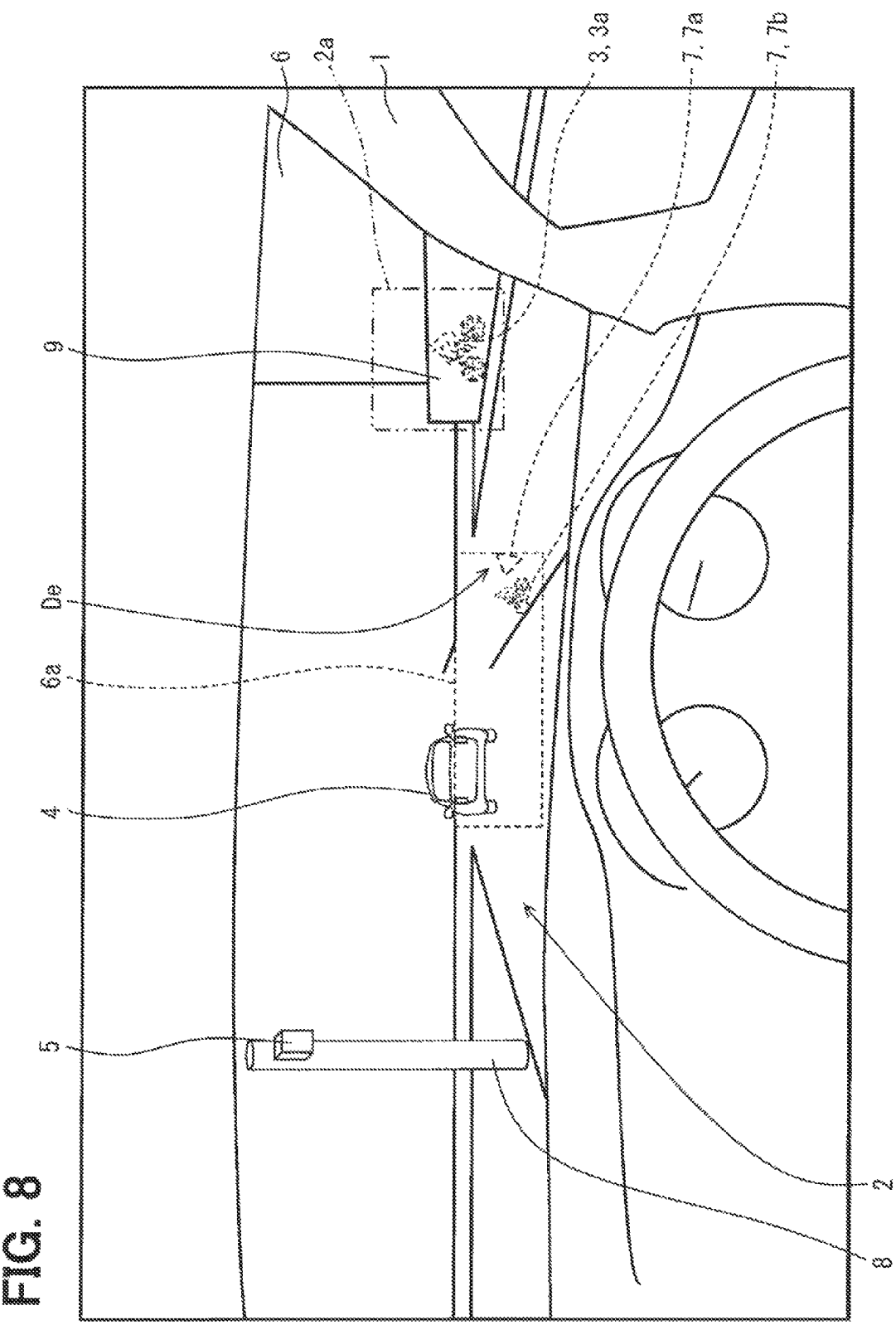
FIG. 8 is an illustration of a display corresponding to FIG. 3 by the drive support display device of FIG. 7.

As shown in FIG. 7, the third embodiment of the present disclosure is a modification of the first embodiment.

According to the third embodiment, it is assumed that the obstacle information Ivv from only one other vehicle 4 is received by the receiver 30 as the object information It. In such situation, although the nearby object 3 still exists in the nearby area 2, there is concern that, when the other vehicle 4 travels afar/away from the self-vehicle 1 in the nearby area 2, the obstacle information Ivv used as the object information It may stop coming in (i.e., discontinued) from the other vehicle 4.

Therefore, in the information processor 3050 of the third embodiment, a storage block 3055 is used as art additional functional block. The storage block 3055 functions in the following manner. That is, when the obstacle information Ivv, i.e., the only information received as the object information It, stops coming in from the other vehicle 4, the storage block 3055 stores the obstacle information Ivv having already received as the object information It in the last sampling period before the discontinuation as store information Ith. The storage function of store information Ith is continued only while the colliding object 3a is selected in this case. Further, during the storage of such store information Ith, the selection of the colliding object 3a by the selection block 51, the setting of the detection range A and the detection parameter P by the setting block 52, and the determination of whether the nearby object 3 has already been detected by the determination block 53 will all be performed based on the store information Ith.

Further, while the store information Ith is in a stored state, the store information Ith is given to a display section 3060 via the instruction block 54 from the storage block 3055. Therefore, in the display section 3060 serving as a "display method" in the third embodiment, an image control unit 3062 receiving an instruction of the warning indicator De together with the store information Ith changes a virtual image display of the object image 7b and the pointer image 7a which are displayed as the warning indicator De.

In such case, the virtual image display of the object image 7b and the pointer image 7a may be changed from a solid line display (refer to FIG. 3) as shown in the first embodiment to a dashed line display as shown in FIG. 3. Alternatively though not illustrated, the virtual image display may be displayed in a blinking manner for displaying the object image 7b and the pointer image 7a.

Figure 9:
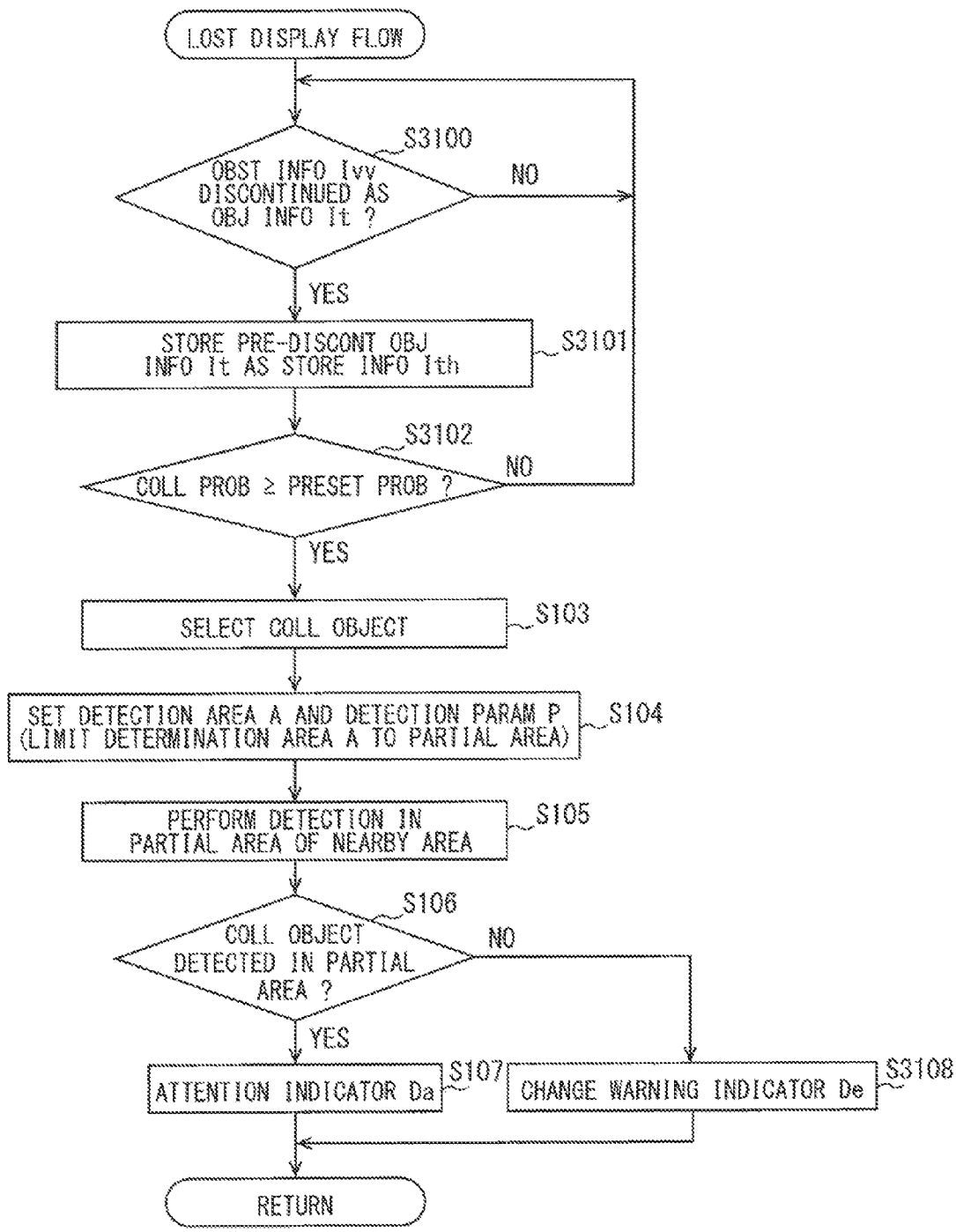
FIG. 9 is a flowchart of a lost display flow by the drive support display device of FIG. 7.

Now, in the driving support display 3010 provided with the information processor 3060 and the display section 3060 as described above, a lost display flow shown in FIG. 9 is executed in parallel with the support display flow. The lost display flow is started, too, when an engine switch is turned ON in the self-vehicle 1, and is finished when the switch is turned OFF.

At S3100 of the lost display flow, if is determined by the receiver 30 whether the obstacle information Ivv received as the only object information It in the last sampling period has stopped, i.e., discontinued. While such determination is negative, S3100 is repeated. When such determination becomes positive, the flow proceeds to S3101.

At S3101, the storage block 3055 stores as the store information Ith the obstacle information Ivv having been received before discontinuation.

Then, at S3102, if is determined by the selection block 51 whether the collision probability of the nearby object 3 identified by the store information Ith stored at S3101 is equal to or greater than the preset probability. When such determination is negative, the flow returns to S3100, and when such determination is positive, the flow proceeds to S103.

Here, when returning to S3100, since the receiver 30 has already turned into another sampling period, the receiver 30 is in a non-receiving state in terms of reception of the obstacle information Ivv at a timing just before the execution of S3100. Therefore, the stored state of the store information Ith will be finished, without proceeding to S3101.

On the other hand, since S103 and S104-S107 of the lost display flow are the same as the one in the support display flow, the same description of those steps will not be repeated in this embodiment.

However, when a negative determination is made at S106, the flow proceeds to S3108.

At S3108, the occupant/driver's attention is called to the colliding object 3a, even though the determination in S106 is negative in terms of the detection of the nearby object 3 in the nearby area 2. This time, however, the warning indicator De is changed from the one in the support display flow, according to an instruction from the instruction block 64 to the display section 60.

Now, after the execution of S3108 or the execution of S107, the flow returns to S3100.

According to the third embodiment described above, when the object information It from the other vehicle 4 stops, based on the store information Ith which has already been received as the object information It before the discontinuation, whether the nearby object 3 has been detected or not is determined. According to such detection scheme, lowering of the effectiveness as the other vehicle 4 travels away from the nearby area 2 is prevented when the self-vehicle 1 is in communication with the other vehicle 4 via the vehicle-to-vehicle communication. Further, the same detection scheme may also be applicable to the second embodiment as a modification thereof.

Other Embodiments

Although the present disclosure has been fully described in connection with preferred embodiments thereof with reference to the accompanying drawings, it is to be noted that various changes and modifications will become apparent to those skilled in the art.

That is, although plural embodiments of the present disclosure are described, the present disclosure is not necessarily limited to each of those embodiments. That is, the modification and combination of those embodiments may also be allowable within the scope of the present disclosure.

For example, as a modification 1 for the first and the second embodiments, it is not necessary to have the selection function for selecting the colliding object 3a by the selection block 51. In the case of this modification 1, the functions by the other blocks 52, 53, 54, 2052, 2053 and the image control unit 62 may be left unchanged for the proper operation of the device if the colliding object 3a is read/considered as all of the nearby objects 3 (i.e., the nearby objects 3=the colliding objects 3a).

As a modification 2 for the first and the third embodiments, it is not necessary to have the limit function limiting the nearby area 2 to the partial area 2a for the setting of the detection range A by the setting block 52.

Further, as a modification 3 for the second embodiment, it is not necessary to have the limit function limiting the partial area 2a to the determination object area 3.

In the above cases, i.e., in the modifications 2 and 3, the determination function by the determination blocks 53, 2053 may be validly usable without any change if the entire nearby area 2 is considered as the partial area 2a. Further, in the modification 2, it is not necessary to have the in-vehicle camera 41 as the field detector 40, which may rather be other device other than the camera 41, such as an ultra-sonic radar, or a millimeter wave radar etc. which may also serve as the field detector 40.

As a modification 4 for the first to the third embodiments, the detection parameter P may be variably set according to different factors different from the detection sensitivity by the setting block 52 or the limit block 2052.

As a modification 5 for the first to the third embodiments, the detection parameter P may be not set by the setting block 52 or the limit block 2052, or may be set to a constant/fixed value by those blocks.

As a modification 6 for the first to the third embodiments, in consideration of the predicted time to collision based on the self-vehicle information Iss and the object information It, etc., the scope of the nearby area 2 may be variably set.

Here, in such modification 6, a receivable distance for the reception of the obstacle information Irv, Ivv, which are used as the object information It, may also be variably set as the nearby area 2.

As a modification 7 for the first to the third embodiments, it is not necessary to receive, as the object information It, one of the obstacle information Ivv by the vehicle-to-vehicle communication and the obstacle information Irv by road-to-vehicle communication.

As a modification 8 for the first to the third embodiments, in addition to or as a replacement of one of the obstacle information Ivv by the vehicle-to-vehicle communication and the obstacle information Irv by road-to-vehicle communication, the obstacle information may be received via a satellite communication or the like, for obtaining the object information It.

Figure 10:
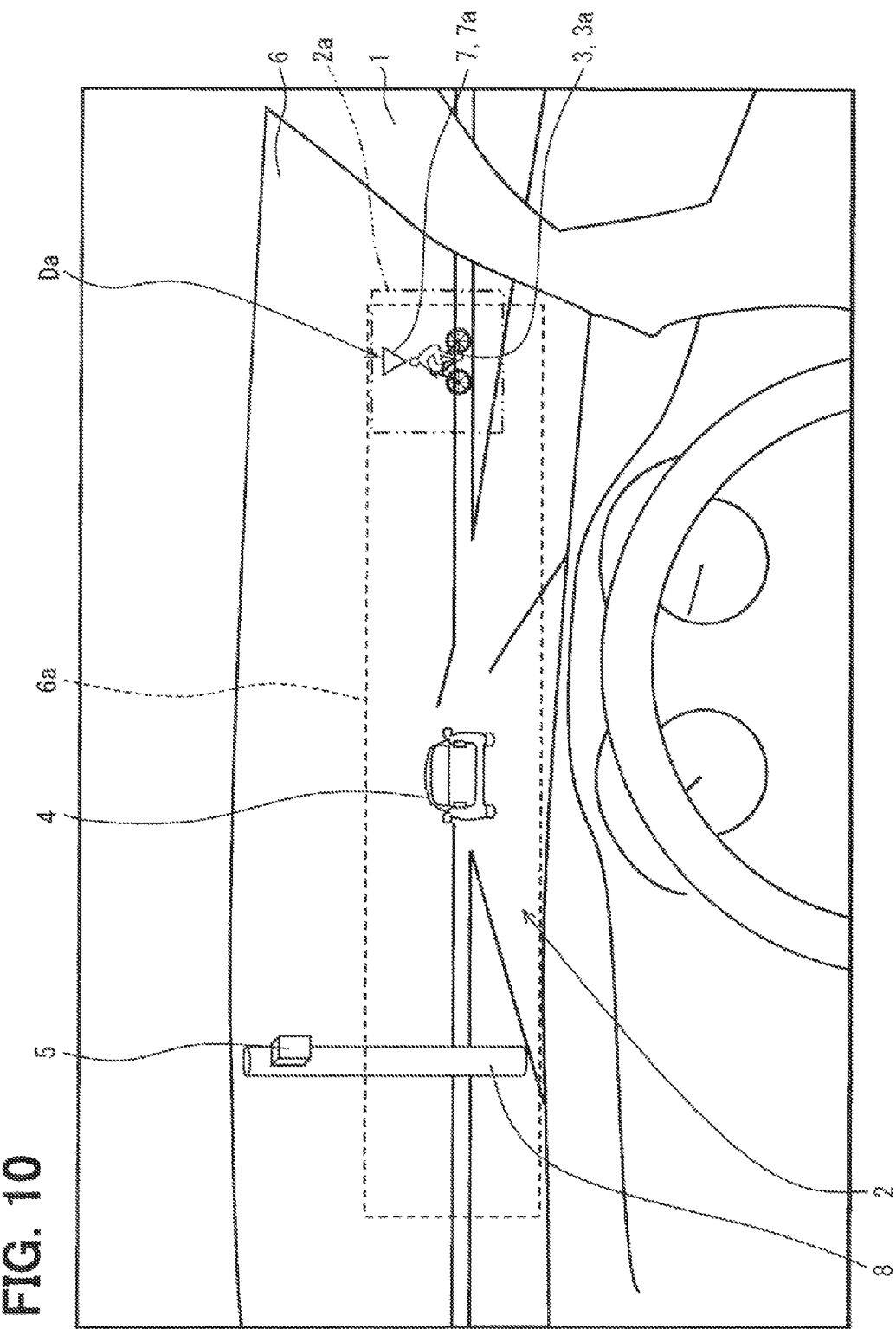
FIG. 10 is an illustration of a display corresponding to FIG. 2 by a modification of the drive support display device of FIG. 1.
Figure 11:
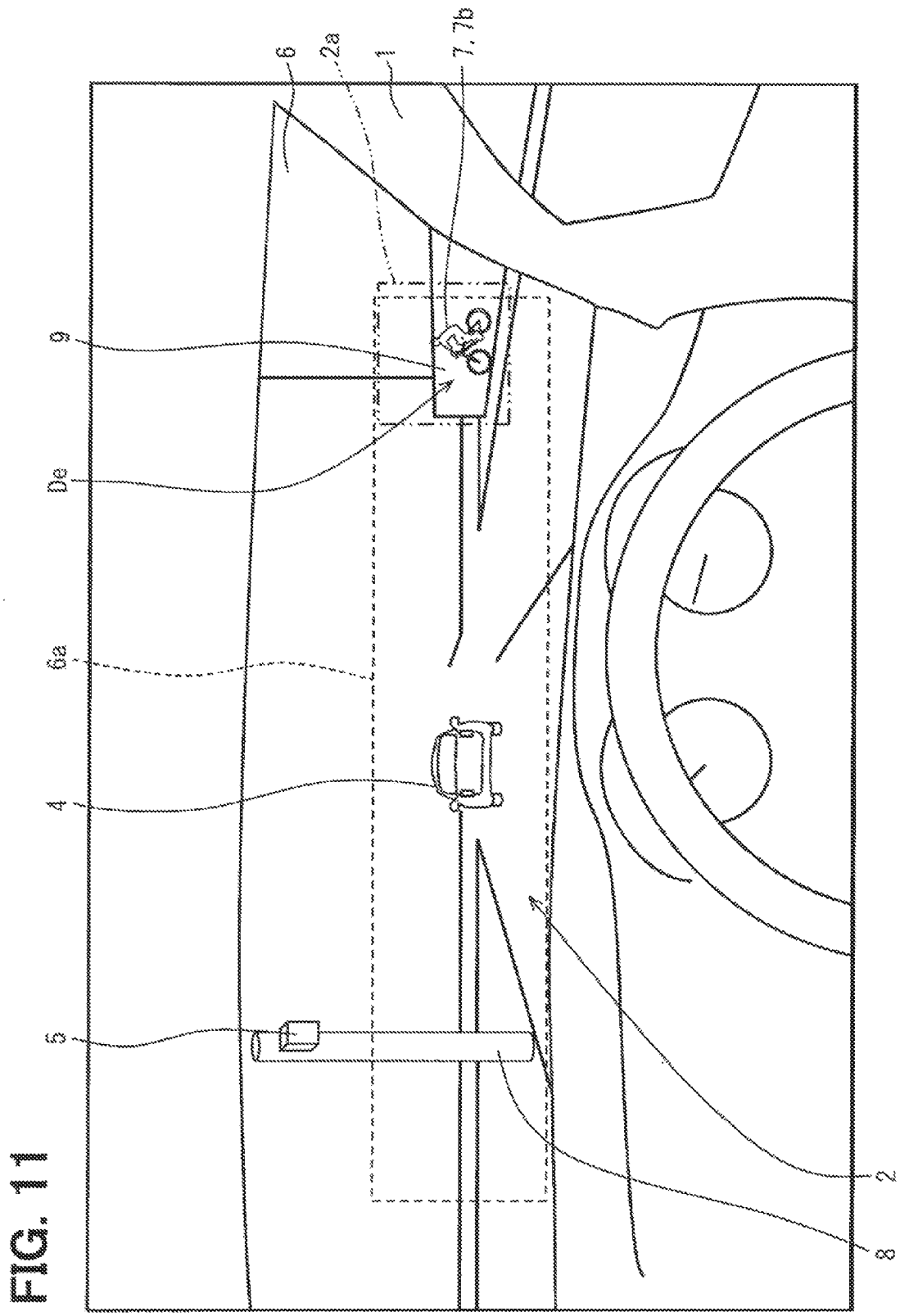
FIG. 11 is an illustration of another display corresponding to FIG. 3 by a modification of the drive support display device of FIG. 1.

As a modification 9 for the first to the third embodiments, as indicated by a dashed line in FIGS. 10 and 11, the projection area 6a of the image 7 on the windshield 6 may be expanded from the lower part toward the upper part of the windshield 6.

Here, in such modification 9, the pointer image 7a may directly point to the current position of the colliding object 3a as shown in FIG. 10, based on the current position of the colliding object 3a and the travel position of the self-vehicle 1.

Further, in such modification 9, the object image 7b as a virtual image may be "superimposed" on the dead-angle creating object 9, e.g., on a building at the current position of the colliding object 3a, based on the current position of the colliding object 3a and the travel position of the self-vehicle 1.

In the modification 9, although only the object image 7b is provided in a form of a virtual image as the warning indicator De as shown in FIG. 11, the object image 7b may also be combined with the pointer image 7a as the warning indicator De, as already described in the first to the third embodiments.

Further, as a modification 10 for the first to the third embodiments, only the object image 7b may be displayed as a virtual image according to the modification 9.

As a modification 11 for the first to the third embodiments, as long as it is intuitively recognized by the occupant, the attention indicator Da may be provided in other forms, which is a different form from the warning indicator De and is a simpler representation form than the warning indicator De, for realizing a non-triangular pointer image pointing the nearby object 3 (i.e., the colliding object 3a) or for realizing other functionality other than the pointing function.

As a modification 12 for the first to the third embodiments, when a positive determination is made by the determination block 53, or 2053, it is not necessary to realize the attention indicator Da by collaboration of the instruction block 54 and the image control unit 62, or 3062.

As a modification 13 for the first to the third embodiments, at least one of the blocks 51, 52, 53, 54, 2052, 2053, and 3055 of the information processors 50, 2050 and 3050 may be physically built by an electric circuit instead of providing function of those blocks by an execution of a process program.

As a modification 14 for the first to the third embodiments, other than the display section 60, or 3060 implemented as the HUD unit 61 for the display of the image 7 as a virtual image, the display section 60, or 3060 may also be implemented as, for example, a display panel, such as a liquid crystal panel, or the like.

Such changes, modifications, and summarized schemes are to be understood as being within the scope of the present disclosure as defined by appended claims.

What is claimed is:

1. A drive support display device supporting a drive of a self-vehicle based on a detection result by an object detector regarding a nearby area of the self-vehicle, the device comprising:
   a receiver that receives object information from an external source, the object information identifying a nearby object existing in the nearby area of the self-vehicle;
   a determination section in a processor, the determination section determining whether the nearby object identified in the object information that is received by the receiver is detected by the object detector; and
   a display section in the processor, the display section providing a warning indicator when the determination section determines that the nearby object is an undetected nearby object that is not detected by the object detector, wherein
   the object information includes external source information that is received by the receiver from the external source via each of a vehicle-to-vehicle communication and a road-to-vehicle communication,
   the object information includes external vehicle information that is received by the receiver from an external vehicle via the vehicle-to-vehicle communication, and
   when the external vehicle information from the external vehicle is discontinued, the determination section determines whether the object detector has detected the nearby object based on the external vehicle information that has been received before discontinuation.

2. The drive support display device in claim 1 further comprising:
   a selection section in the processor, the selection section selecting a colliding object from among the nearby objects that are identified by the object information received by the receiver, and indicating the colliding object with the warning indicator, the colliding object being predicted to collide with the self-vehicle.

3. The drive support display device in claim 1 further comprising:
   a limit section in the processor, the limit section limiting the nearby area to a partial area within which the nearby object is determined to exist, wherein
   the determination section determines whether the nearby object is detected within the partial area.

4. The drive support display device in claim 1 further comprising:
   a setting section in the processor, the setting section setting a detection parameter to detect the nearby object with the object detector, wherein
   the setting section increases the detection parameter based on the object information received by the receiver, which increases detection sensitivity to detect the nearby object with the object detector.

5. The drive support display device in claim 1, wherein
   when the determination section determines that the nearby object is detected, the display section provides an attention indicator that is different from the warning indicator.

6. The drive support display device in claim 5, wherein
   the display section projects a virtual image onto a transparent member which reflectively displays the virtual image projected thereon while allowing an actual image of the nearby object to be transparently viewable therethrough,
   the display section provides the attention indicator to indicate the nearby object by projecting a virtual image of a pointer onto the transparent member, and
   the display section provides the warning indicator to indicate the nearby object by projecting a virtual image of the nearby object that has an identical shape as the nearby object onto the transparent member.

7. The drive support display device in claim 1, wherein
   the determining of whether the nearby object, which is identified in the object information that is received by the receiver, is detected by the object detector includes comparing the object information that is received by the receiver with the detection result by the object detector.

8. A drive support display device supporting a drive of a self-vehicle based on a detection result by an object detector regarding a nearby area of the self-vehicle, the device comprising:
   a receiver that receives object information from an external source, the object information identifying a nearby object existing in the nearby area of the self-vehicle;
   a determination section in a processor, the determination section determining whether the nearby object identified in the object information that is received by the receiver is detected by the object detector; and
   a display section in the processor, the display section providing a warning indicator when the determination section determines that the nearby object is an undetected nearby object that is not detected by the object detector, wherein
   when the determination section determines that the nearby object is detected, the display section provides an attention indicator that is different from the warning indicator,
   the display section projects a virtual image onto a transparent member which reflectively displays the virtual image projected thereon while allowing an actual image of the nearby object to be transparently viewable therethrough, the display section provides the attention indicator to indicate the nearby object by projecting a virtual image of a pointer onto the transparent member, and the display section provides the warning indicator to indicate the nearby object by projecting a virtual image of the nearby object that has an identical shape as the nearby object onto the transparent member.

9. The drive support display device in claim 8 further comprising:

a selection section in the processor, the selection section selecting a colliding object from among the nearby objects that are identified by the object information received by the receiver, and indicating the colliding object with the warning indicator, the colliding object being predicted to collide with the self-vehicle.

10. The drive support display device in claim 8 further comprising:

a limit section in the processor, the limit section limiting the nearby area to a partial area within which the nearby object is determined to exist, wherein the determination section determines whether the nearby object is detected within the partial area.

11. The drive support display device in claim 8 further comprising:

a setting section in the processor, the setting section setting a detection parameter to detect the nearby object with the object detector, wherein the setting section increases the detection parameter based on the object information received by the receiver, which increases detection sensitivity to detect the nearby object with the object detector.

12. The drive support display device in claim 8, wherein the object information includes external source information that is received by the receiver from the external source via each of a vehicle-to-vehicle communication and a road-to-vehicle communication.

13. The drive support display device in claim 8, wherein the determining of whether the nearby object, which is identified in the object information that is received by the receiver, is detected by the object detector includes comparing the object information that is received by the receiver with the detection result by the object detector.

\* \* \* \* \*